United States Patent
Brown

(10) Patent No.: US 9,256,808 B2
(45) Date of Patent: Feb. 9, 2016

(54) CLASSIFYING AND ANNOTATING IMAGES BASED ON USER CONTEXT

(71) Applicant: Invent.ly LLC, Woodside, CA (US)

(72) Inventor: Stephen J. Brown, Woodside, CA (US)

(73) Assignee: Invent.ly LLC, Woodside, CA (US)

( * ) Notice: Subject to any disclaimer, the term of this patent is extended or adjusted under 35 U.S.C. 154(b) by 0 days.

(21) Appl. No.: 14/840,012

(22) Filed: Aug. 30, 2015

(65) Prior Publication Data

US 2015/0371114 A1    Dec. 24, 2015

Related U.S. Application Data

(62) Division of application No. 14/188,035, filed on Feb. 24, 2014.

(51) Int. Cl.
*G06K 9/62*    (2006.01)
*G06F 17/30*    (2006.01)
*G06F 17/24*    (2006.01)
*H04N 5/262*    (2006.01)

(52) U.S. Cl.
CPC ............ *G06K 9/6267* (2013.01); *G06F 17/241* (2013.01); *G06F 17/3028* (2013.01); *G06F 17/30268* (2013.01); *H04N 5/262* (2013.01)

(58) Field of Classification Search
CPC .................. G06F 17/30241; G06F 17/30256; G06F 17/30271; G06F 17/3028; G06K 9/32
USPC ........................................................ 382/224
See application file for complete search history.

(56) References Cited

U.S. PATENT DOCUMENTS

| | | | |
|---|---|---|---|
| 8,311,344 B2 | 11/2012 | Dunlop et al. |
| 8,520,909 B2 | 8/2013 | Leung et al. |
| 8,525,888 B2 | 9/2013 | Abe |
| 8,724,909 B2 | 5/2014 | Quack |

(Continued)

FOREIGN PATENT DOCUMENTS

EP    2469230 A1    6/2012

OTHER PUBLICATIONS

Sensor Hub Partner—Bosch Sensortec GmbH, Product URL:http://www.bosch-sensortec.com/en/homepage/products_3/9_axis_sensors_5/ecompass_2/bno055_2/bno055_3, Website: http://www.bosch-sensortec.com, Jan. 7, 2013, Robert Bosch GmbH, Stuttgart, Germany, 6 pages.

(Continued)

*Primary Examiner* — Manuchehr Rahmjoo
(74) *Attorney, Agent, or Firm* — Rahman LLC

(57) ABSTRACT

Annotating and classifying an image based on a user context includes determining a location data of an object captured in an image, determining an attribute data of the object, obtaining sensor data from sensors that are associated with the location data based on the attribute data, determining a recommended user context from one or more predefined user contexts based on a comparison of the location data, the attribute data, and the sensor data with location data, attribute data, and sensor data of one or more images associated with the one or more predefined user contexts, determining a recommended class of the captured image based on the recommended user context, selecting one or more annotation data from the location data, the attribute data, and the sensor data based on the recommended class or the recommended user context, and annotating the image with the one or more annotation data.

7 Claims, 12 Drawing Sheets

(56) References Cited

U.S. PATENT DOCUMENTS

| | | | |
|---|---|---|---|
| 2005/0046706 A1 | 3/2005 | Sesek et al. | |
| 2007/0030348 A1 | 2/2007 | Snyder | |
| 2008/0129825 A1 | 6/2008 | DeAngelis et al. | |
| 2012/0110082 A1 | 5/2012 | Brown et al. | |
| 2012/0300089 A1* | 11/2012 | Sbaiz | H04N 1/00323 348/222.1 |
| 2012/0307048 A1 | 12/2012 | Abrahamsson et al. | |
| 2013/0046761 A1 | 2/2013 | Soderberg et al. | |
| 2013/0282747 A1 | 10/2013 | Cheng et al. | |

OTHER PUBLICATIONS

ADIS16407 datasheet and product info | Ten Degrees of Freedom Inertial Sensor | MEMS Inertial Measurement Units | Analog Devices, http://www.analog.com/en/mems-sensors/mems-inertial-measurement-units/adis16407/products/product.html, Feb. 14, 2012, Analog Devices, Inc., Norwood, MA, 27 pages.

Time Series Analysis and Forecasting with Weka, Pentaho Data Logo, Pentaho package for Weka, Adaptavist Theme Builder (4.2.0) Powered by Atlassian Confluence 3.3.3, the Enterprise Wiki, http://wiki.pentaho.com/display/DATAMINING/Time+Series+Analysis+and+Forecasting+with+Weka, May 4, 2011, Pentaho, A Hitachi Data Systems Company, Orlando, FL, 14 pages.

OpenTSDB—A Distributed, Scalable Monitoring System, © 2010-2013 The OpenTSDB Authors, http://opentsdb.net/index.html.

TempoDB, The time series database-as-a-service, TempoDB Inc. © 2014, https://tempo-db.com/.

Sensor Hub Partner—Bosch Sensortec GmbH, Product URL:http://www.bosch-sensortec.com/en/homepage/products_3/9_axis_sensors_5/ecompass_2/bno055_21bno055_3, Website: http://www.bosch-sensortec.com, Jan. 7, 2013.

ADIS16407 datasheet and product info | Ten Degrees of Freedom Inertial Sensor | MEMS Inertial Measurement Units | Analog Devices, http://www.analog.com/en/mems-sensors/mems-inertial-measurement-units/adis16407/products/product.html, Feb. 14, 2014.

Apache Mahout, What is Apache Mahout?, Copyright © 2014 The Apache Software Foundation, Licensed under the Apache License, Version 2.0., http://mahout.apache.org/.

Time Series Analysis and Forecasting with Weka, Pentaho Data Logo, Pentaho package for Weka, Adaptavist Theme Builder (4.2.0) Powered by Atlassian Confluence 3.3.3, the Enterprise Wiki, http://wiki.pentaho.com/display/DATAMINING/Time+Series+Analysis+and+Forecasting+with+Weka, May 4, 2011.

* cited by examiner

| PREDEFINED USER CONTEXTS 502 | IMAGES 504 | PRIOR CONTEXTUAL INFORMATION 506 | | | |
|---|---|---|---|---|---|
| WEATHER | PHOTO OF SKY | LOCATION DATA | OBJECT DISTANCE | INCLINATION ANGLE | LATITIUDE AND LONGITUDE DATA | DATE AND TIME |
| | | | - | CAMERA FACING UPWARD, 60 DEGREES | 37.0000° N, 120.0000° W | JANUARY 01, 2014, 10 PM |
| | | ATTRIBUTE DATA: SKY | | | | |
| | | CONTEXT VECTOR: (60°, 37.0000° N, 120.0000° W, Jan 01 2014, 10 PM, Sky, Weather information) | | | | |
| SOCIAL | PHOTO OF A PERSON 'JOHN' | LOCATION DATA | OBJECT DISTANCE | INCLINATION ANGLE | LATITIUDE AND LONGITUDE DATA | DATE AND TIME |
| | | | 2 METERS | CAMERA FACING UPWARD, 20 DEGREES | 40.6700° N, 73.9400° W | JANUARY 10, 2014, 8 PM |
| | | ATTRIBUTE DATA: PERSON | | | | |
| | | USER ACTIVITY: USING AN APPLICATION | | | | |
| | | CONTEXT VECTOR: ( 2 Mts, 20°, 40.6700° N, 73.9400° W, Jan 10 2014, 8 PM, Person, Application, Social, John, Buddy) | | | | |
| FLIGHT INFORMATION | PHOTO OF AN AIRPLANE IN THE SKY | LOCATION DATA | OBJECT DISTANCE | INCLINATION ANGLE | LATITIUDE AND LONGITUDE DATA | DATE AND TIME |
| | | | - | CAMERA FACING UPWARD, 60 DEGREES | 37.0000° N, 120.0000° W | JANUARY 01, 2014, 11 PM |
| | | ATTRIBUTE DATA: SKY AND AIRPLANE | | | | |
| | | CONTEXT VECTOR: (60°, 37.0000° N, 120.0000° W, Jan 01 2014, 11 PM, Sky, Airplane, Flight information) | | | | |

FIG. 5

| USERS | IMAGE 602 | CURRENT CONTEXTUAL INFORMATION 610 | | | | | CONTEXTS 608 | CLASSES 606 |
|---|---|---|---|---|---|---|---|---|
| USER 102 | SKY | LOCATION DATA | OBJECT DISTANCE | INCLINATION ANGLE | LATITIUDE AND LONGITUDE DATA | DATE AND TIME | | |
| | | | - | CAMERA FACING UPWARD, 60 DEGREES | 62.2270° N, 105.3809° W | JANUARY 02, 2014, 6 AM | | |
| | | ATTRIBUTE DATA | SKY | | | | WEATHER | FORECASTS |
| | | SENSOR DATA | DATA FROM AN ENVIRONMENTAL SENSOR AND PUBLIC INFORMATION AVAILABLE AT OBJECT LOCATION | | | | | |
| | | USER'S RECENT ACTIVITY | - | | | | | |
| USER 604 | SKY | LOCATION DATA | OBJECT DISTANCE | INCLINATION ANGLE | LATITIUDE AND LONGITUDE DATA | DATE AND TIME | | |
| | | | - | CAMERA FACING UPWARD, 60 DEGREES | 21.0000° N, 78.0000° E | JANUARY 01, 2014, 11 AM | | |
| | | ATTRIBUTE DATA | SKY | | | | GALAXY | NATURE |
| | | SENSOR DATA | DATA FROM AN ENVIRONMENTAL SENSOR AND PUBLIC INFORMATION AVAILABLE AT OBJECT LOCATION | | | | | |
| | | USER'S RECENT ACTIVITY | - | | | | | |

FIG. 6

| USER | IMAGE 704 | CURRENT CONTEXTUAL INFORMATION 710 | | | | | CONTEXT 706 | ANNOTATIONS 702 |
|---|---|---|---|---|---|---|---|---|
| USER 102 | PHOTO OF A PERSON 'JOHN' | LOCATION DATA | OBJECT DISTANCE | INCLINATION ANGLE | LATITUDE AND LONGITUDE DATA | DATE AND TIME | SOCIAL | JOHN, MY FRIEND |
| | | | 4 METERS | CAMERA FACING UPWARD | 37.3700° N, 122.0400° W | FEBRUARY 01, 2014 | | |
| | | ATTRIBUTE DATA | PERSON | | | | | |
| | | SENSOR DATA | DATA FROM A SOCIAL SENSOR | | | | | |
| | | USER'S RECENT ACTIVITY | - | | | | | |
| USER 708 | PHOTO OF A PERSON 'JOHN' | LOCATION DATA | OBJECT DISTANCE | INCLINATION ANGLE | LATITUDE AND LONGITUDE DATA | DATE AND TIME | SOCIAL | JOHN, MY BROTHER |
| | | | 6 METERS | CAMERA FACING UPWARD | 38.8951° N, 77.0367° W | MARCH 01, 2014 | | |
| | | ATTRIBUTE DATA | PERSON | | | | | |
| | | SENSOR DATA | DATA FROM A SOCIAL SENSOR | | | | | |
| | | USER'S RECENT ACTIVITY | - | | | | | |

FIG. 7

| SI. NO | LOCATION OF OBJECT | LOCATION DATA 804 | | | RULE RESULT 806 | CONTEXT 802 |
|---|---|---|---|---|---|---|
| | | CAMERA INCLINATION ANGLE/TYPE | RANGE | DATE AND TIME | | |
| 1 | RESTAURANT | FACING DOWN | CLOSE | - | MENU CARD | FOOD OR DIET |
| 2 | OFFICE | HORIZONTAL | CLOSE | JANUARY 02 2014, 11AM | PERSON | BUSINESS |
| 3 | XYZ | HORIZONTAL | CLOSE | JANUARY 02 2014, 8PM | PERSON | SOCIAL |
| 4 | OFFICE | FRONT CAMERA | CLOSE | - | SELF PICTURE | BUSINESS |
| 5 | ABC | REAR CAMERA | CLOSE | - | PERSON | SOCIAL |
| 6 | LIBRARY | FACING DOWN | SUPER CLOSE | - | DOCUMENT | LEGAL |
| 7 | CDE HOTEL | - | MEDIUM | - | SEMINAR | EVENT |
| 8 | ZZZ | - | LONG DISTANCE | - | SCENERY | VACATION |
| 9 | STORE | - | CLOSE | - | SEARCH FOR OBJECT PRICING INFORMATION | PURCHASE |
| 10 | RESTAURANT | - | CLOSE | - | LINK TO YELP REVIEW | FOOD |

FIG. 8

| SI. NO | IMAGES 904 | RULES 902 |
|---|---|---|
| 1 | IMAGE IS A PERSON WHO IS A FRIEND ON A SOCIAL MEDIUM | SHARE THE IMAGE ON THE SOCIAL MEDIUM |
| 2 | IMAGE IS A PERSON WHO IS IN USER'S ADDRESS BOOK OR PHONE CONTACTS | SHARE THE IMAGE WITH THE PERSON IN A PRIVATE MESSAGE |
| 3 | IMAGE FROM A TOURIST LOCATION | SAVE THE IMAGE IN A TRIP ALBUM AND SHARE WITH FAMILY |
| 4 | IMAGE RELATES TO EVENTS SUCH AS SPORTS OR CONCERT | SHARE WITH A SOCIAL MEDIUM |
| 5 | IMAGE RELATES TO AN EVENT THAT ASSOCIATES WITH A NEWS EVENT | SHARE IMAGE WITH A MEDIA OR POST PUBLICLY |
| 6 | IMAGE IS TILTED UP | LINK TO IMAGES WITH SIMILAR TILT |
| 7 | IMAGE IS TILTED DOWN | STORE IN PRIVATE NOTEBOOK |

FIG. 9

CLASSIFYING AND ANNOTATING IMAGES BASED ON USER CONTEXT

CROSS-REFERENCE TO RELATED APPLICATIONS

This application is a divisional of U.S. patent application Ser. No. 14/188,035, filed on Feb. 24, 2014, which relates to U.S. patent application Ser. No. 14/188,122 filed on Feb. 24, 2014 and entitled "Automatically Generating Notes and Classifying Multimedia Content Specific to a Video Production," the complete disclosure of which, in their entireties, are herein incorporated by reference.

BACKGROUND

1. Technical Field

The embodiments herein generally relate to classifying and annotating multimedia content, and more particularly to classifying and annotating images based on a user context and intention.

2. Description of the Related Art

Rapid technological development in handheld devices such as digital cameras, smartphones, and any other camera enabled devices enables capturing and processing images ubiquitously. The number of such images being captured and stored is rapidly increasing. Images that are captured can be shared with private connections, over a social network, or with the public. With huge volumes of such images, classification of the images has become essential for organizing, retrieving, and sharing these images. When classification of images is performed manually, users have to spend a substantial amount of time and effort. Images can be searched and retrieved by annotating them with tags. Tagging images with inaccurate information results in large collections of unrelated images being lumped together, making it difficult to organize.

Existing approaches that attempt to address the problem of image classification typically capture the location of a camera and tag the image based on the camera location. However, the location of the camera itself may not be directly relevant to the image or to the intent or purpose of the photographer in capturing the image. Annotating the image with the location data of the camera may thus often result in inaccurate image classification. Further, the same image can have different meanings to different users or for the same user at different occasions, depending upon the intended purpose. It may also have the same meaning in general (e.g., social photos), but different users may have different relationships with objects of an image. For example, a photo of a user in a business context may have a very different meaning and may hence require different annotations than a photo from the same user in a social context for effective searching, retrieving and sharing in a targeted manner.

Existing approaches that are simply based on available data generally do not suggest how to individualize annotations or how to prioritize classifications when there are many different context-dependent possibilities or classifications, as they do not determine which of the available data is relevant to the purpose of the user. The existing approaches also generally do not improve the fit between the image and the annotation with time either. Accordingly, there remains a need for a system and method for annotating and classifying images based on a user context, and for improving accuracy in annotating the images over time.

SUMMARY

In view of the foregoing, an embodiment herein provides a method for annotating and classifying an image based on a user context. The method includes determining, by a location data determining unit, a location data of an object captured in an image by a camera enabled device; determining, by a processor, an attribute data of the object based on the image; obtaining sensor data from sensors that are associated with the location data based on the attribute data; determining, by the processor, a recommended user context from one or more predefined user contexts based on a comparison of the location data, the attribute data, and the sensor data with location data, attribute data, and sensor data of one or more images associated with each of the one or more predefined user contexts; determining, by the processor, a recommended class of the captured image based on the recommended user context; selecting, by the processor, one or more annotation data from the location data of the object, the attribute data of the object, and the sensor data from the sensors based on the recommended class or the recommended user context; and annotating, by the processor, the image with the one or more annotation data.

A list of prioritized predefined user contexts may be generated by the processor based on the comparison. The recommended user context is a highest priority user context from the list of prioritized predefined user contexts. A recommendation that includes at least one of the recommended user context and the recommended class may be generated by the processor, and at least one of a user suggested context and a user suggested class is processed by the processor.

A weight associated with the location data, the attribute data, and the sensor data associated with the captured image may be modified to obtain a modified weight based on which the user suggested context or the user suggested class is prioritized over the recommended user context or the recommended class, and a revised recommended user context or a revised recommended class is determined by the processor for a subsequent image captured at a subsequent time based on the modified weight.

The recommended user context and the recommended class of the captured image are determined based on a set of rules that are stored in a database. The location data of the object includes at least one of a distance of the object from the camera enabled device, a camera inclination angle associated with the camera enabled device, a latitude and longitude data of the object, and a timestamp of the image.

The sensors that are associated with the location data may include an environmental sensor, an object sensor, and a social sensor. The sensor data obtained from the environmental sensor may include weather data, temperature data, pressure data, humidity data, wind data, precipitation data, and data from a chemical sensor, an allergen sensor, a noise sensor, and a light sensor.

The sensor data obtained from the object sensor includes the attribute data of the object in the image. The sensor data obtained from the social sensor may include private data to identify a person in the image, data associated with people at the location of the object, and data from a social medium. The sensor data may include reviews, articles, electronic messages, information from the World Wide Web, and news from a location of the object.

In another aspect, a camera enabled device for classifying an image based on a user context is provided. The camera enabled device includes a camera that captures an image of an object, a location data determining unit that determines a location data of the object captured in the image, a memory unit that stores a set of modules and a database, and a processor that executes the set of modules. The set of modules includes an attribute data determination module when executed by the processor determines an attribute data of the object based on the image, a sensor data obtaining module when executed by the processor obtains sensor data from sensors that are associated with the location data based on the attribute data, a user context determination module when executed by the processor determines a recommended user context from one or more predefined user contexts based on a comparison of the location data, the attribute data, and the sensor data with location data, attribute data, and sensor data of one or more images associated with each of the one or more predefined user contexts, a relevant class determination module when executed by the processor determines a recommended class of the image based on the recommended user context, and an image classification module when executed by the processor classifies the image based on the recommended class.

The set of modules may further include an annotation data selection module when executed by the processor selects one or more annotation data from at least one of the location data of the object, the attribute data of the object, and the sensor data from the sensors based on the recommended class or the recommended user context, and an image annotation module when executed by the processor annotates the image with the annotation data.

The user context determination module when executed by the processor generates a list of prioritized predefined user contexts based on the comparison. The recommended user context is a highest priority user context from the list of prioritized predefined user contexts. The set of modules further includes a recommendation generation module when executed by the processor generates a recommendation that includes at least one of the recommended user context and the recommended class, and an input processing module when executed by the processor processes at least one of a user suggested context and a user suggested class.

The set of modules further includes a weight module when executed by the processor modifies a weight associated with at least one of the location data of the object, the attribute data of the object, and the sensor data from the sensors associated with the image to obtain a modified weight based on which the user suggested context and the user suggested class are prioritized over the recommended user context and the recommended class. The user context determination module determines a revised recommended user context and a revised recommended class for a subsequent image captured at a subsequent time based on the modified weight.

The recommended user context and the recommended class of the image are determined based on a set of rules that are stored in the database. The location data determining unit includes a range finder that records a distance of the object from the camera enabled device, a tilt-roll-pitch sensor that calculates a camera inclination angle of the camera enabled device, a global positioning system that determines a location of the object, and a compass that calculates a latitude and longitude data of the object.

In yet another aspect, an annotation data server that includes a memory unit that stores a database is provided. The annotation data server includes a processor that receives a location data of an object captured in an image, determines an attribute data of the object, obtains sensor data from sensors that are associated with the location data based on the attribute data, determines a recommended user context from a plurality of predefined user contexts based on a comparison of the location data, the attribute data, and the sensor data with location data, attribute data, and sensor data of one or more images associated with each of the plurality of predefined user contexts, selects one or more annotation data from the location data of the object, the attribute data of the object, and the sensor data from the sensors based on a recommended class of the image or the recommended user context, and generates a recommendation that include the one or more annotation data for annotating the image. The recommended user context is determined based on a set of rules that are stored at the database.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a table view illustrating predefined user contexts according to an embodiment herein;

FIG. 6 is a table view illustrating classification of an image captured by two different users into two different classes based on contexts of the users according to an embodiment herein;

FIG. 7 is a table view illustrating personalized annotations of an image captured by two different users having a similar context according to an embodiment herein;

FIG. 8 is a table view illustrating a context of the user determined based on a location data of an object captured in an image and a set of rules stored in the database according to an embodiment herein;

FIG. 9 is a table view illustrating rules for sharing images according to an embodiment herein;

DETAILED DESCRIPTION

Figure 1:
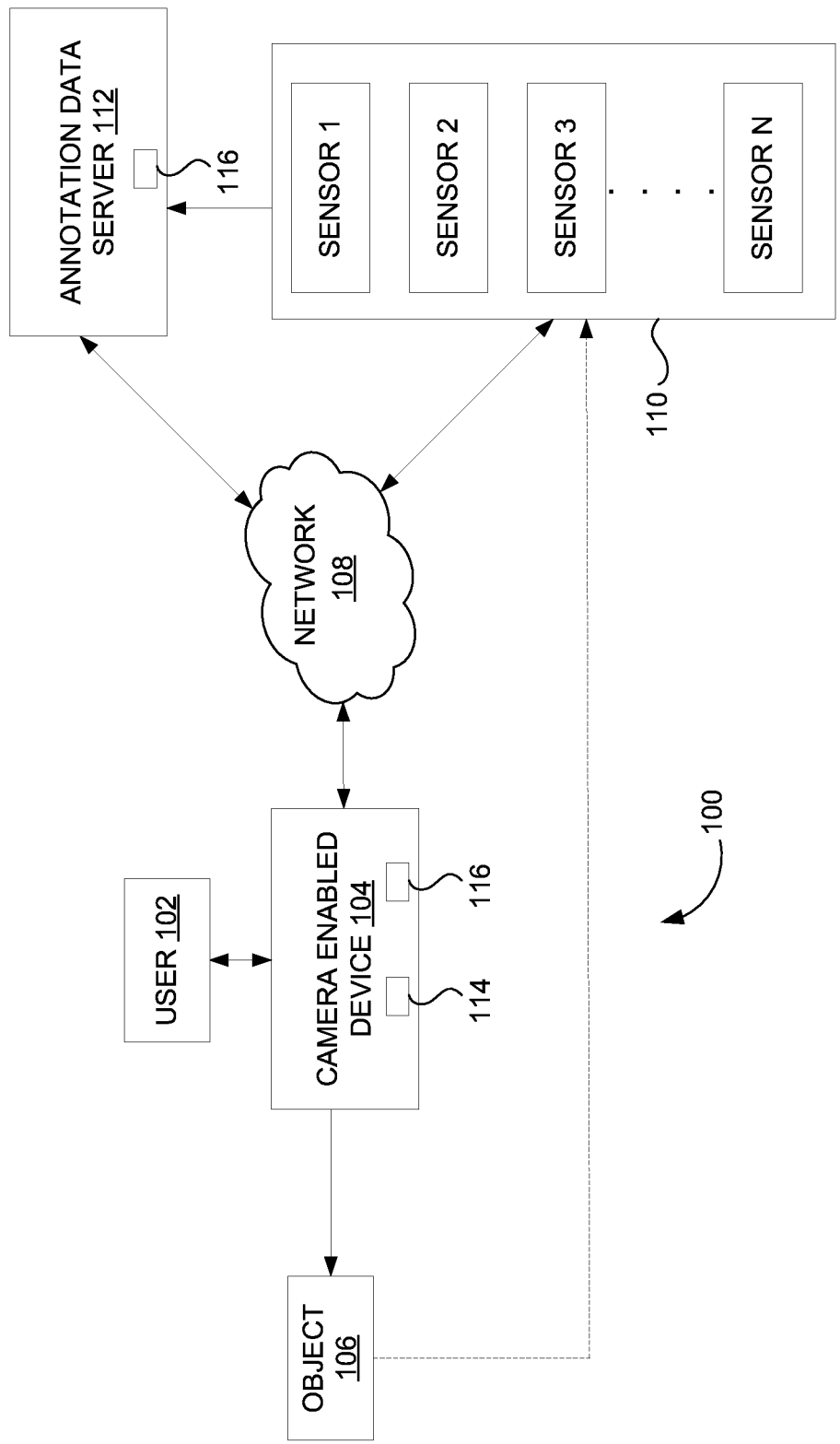
FIG. 1 is a system for annotating and classifying an image according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for annotating and classifying images based on a user context, and improving accuracy in determining contexts, classes and annotations over the time. The embodiments herein achieve this by identifying a context of a user in capturing an image by mapping current contextual information of an object captured in the image with user pattern data. A relevant class of the image is determined based on the context of the user, and the image is annotated with one or more tags based on the relevant class or the context. Referring now to the drawings, and more particularly to FIGS. 1 through 12, where similar reference characters denote corresponding features consistently throughout the figures, there are shown preferred embodiments.

FIG. 1 is a system 100 illustrating a user 102 capturing an image of an object 106 using a camera enabled device 104 that includes a location data determining unit 114 and an image annotation and classification tool 116 at the camera enabled device 104 or an annotation data server 112 that obtains sensor data from sensors 110 through a network 108 for annotating and classifying the image according to an embodiment herein. The camera enabled device 104 may include any of a mobile phone (e.g., a smartphone), a digital camera, a tablet, etc. The location data determining unit 114 determines a location data associated with the object 106 captured in the image. The user may be an individual or a computer/machine.

The image annotation and classification tool 116 determines a context and an intention of the user 102 in capturing the image of the object 106 based on current contextual information and user pattern data. The current contextual information of the image includes the location data of the object 106, an attribute data, sensor data from the sensors 110, and/or a recent activity of the user 102 with the camera enabled device 104. The recent activity of the user 102 may include sending an email or a message, a phone call, a usage of an application (e.g., a chat application, a photo sharing application, and/or a social network) in the camera enabled device 104, and/or a calendar entry.

The user pattern data includes predefined user contexts that may be locally stored at the camera enabled device 104 or may be stored remotely at the annotation data server 112. A predefined user context may include (i) images, and (ii) contexts, classes, annotations and sensor data (e.g., a location data, an attribute data, and data from sensors) associated with each image. The images and the sensor data may be preprogrammed, user-defined, and/or derived from images captured by the user 102 in the past. With the context of the user 102 and/or the current contextual information, a relevant class of the image is determined to cluster the image with the relevant class. The image is further annotated with the current contextual information based on the context of the user 102 or the relevant class.

The location data of the object 106 that is determined using the location data determining unit 114 includes, but is not limited to, (a) a distance of the object 106 from the camera enabled device 104, (b) an inclination angle of the camera enabled device 104 when capturing the image, (c) a location of the object 106, (d) a latitude and longitude data of the location of the object 106, (e) a data and time of capturing the image, (f) a motion of the camera enabled device 104, and (g) lighting information on the camera enabled device 104. In one embodiment, the location data of the object and a context may also be determined based on information from a location database (e.g., Google® places, Foursquare® checkins, Facebook® places, etc).

An attribute data of the object 106 captured in the image indicates an object type based on features of the object 106. For example, the object 106 captured in the image may be an individual who is a friend of the user 102. In this context, the image annotation and classification tool 116 determines a corresponding attribute data of the object 106 as a person.

Sensor data is obtained from the sensors 110 that are associated with the location data of the object 106 through the network 108. The sensors 110 may include an environmental sensor, an object sensor, and a social sensor. The environmental sensor may collect weather information, temperature information, pressure information, humidity information, wind information, precipitation information, and/or information from at least one of a chemical sensor, an allergen sensor, a noise sensor, and a light sensor.

The object sensor may sense proximity to an object (e.g., a train, a building, a tree, or a car) or equipment using near field communication (NFC), a transponder, and/or RFID to identify the object. The object sensor may also sense proximity to another camera enabled device. The social sensor includes data from social media (e.g., Facebook®, LinkedIn®, Twitter®, Google+®, etc). Examples of such sensor data include private data to identify a person in the image, location-based posts of people in a photo, and/or people at the location of the object. However, in one embodiment, sensor data is also obtained from publicly available data such as reviews, articles, Tweet™ messages, information from the World Wide Web, and news from a location of the object. In one embodiment, sensor data is obtained from the sensors 110 based on the attribute data. For example, when the user 102 captures an image of an airplane in the sky, the image annotation and classification tool 116 determines an attribute data as 'flight'. Then, the image annotation and classification tool 106 obtains sensor data from an object sensor that includes flight information.

Figure 2:
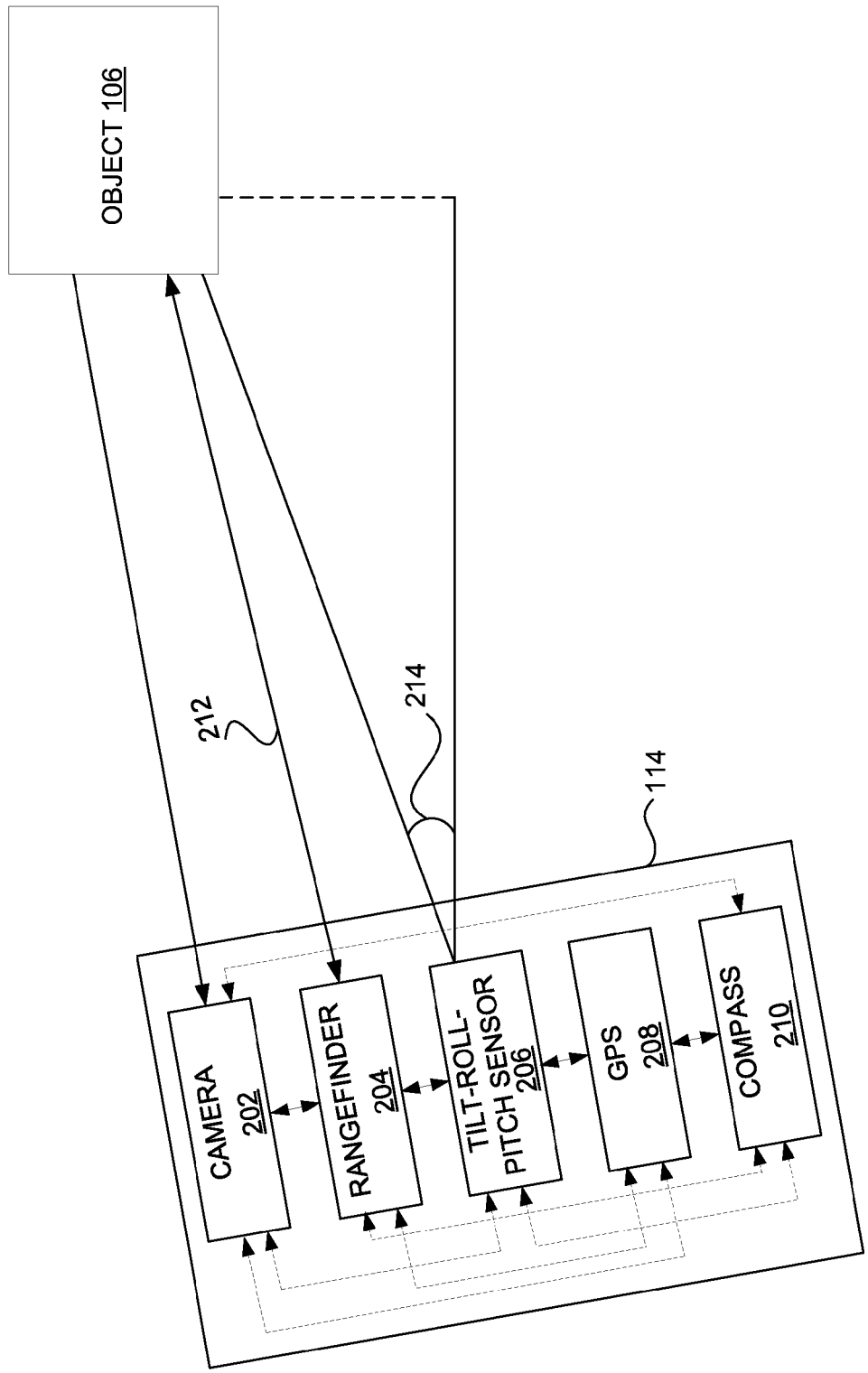
FIG. 2 is a block diagram of the location data determining unit of the camera enabled device of FIG. 1 according to an embodiment herein.

FIG. 2, with reference to FIG. 1, illustrates the location data determining unit 114 of the camera enabled device 104 of FIG. 1 according to an embodiment herein. The location data determining unit 114 may include one or more of a camera 202, a rangefinder 204, a tilt-roll-pitch sensor 206, a global positioning system (GPS) 208, and a compass 210. The camera 202 captures an image of the object 106. The rangefinder 204 records a distance 212 of the object 106 from the camera enabled device 104. The tilt-roll-pitch sensor 206 calculates a camera inclination angle 214. The compass 210 calculates a latitude and longitude data of a location of the object 106 and/or the camera enabled device 104. The location data determining unit 114 may include a gyro meter, a magnetometer, or an accelerometer for determining an orientation of the camera enabled device 104.

The camera enabled device 104 may also include one or more additional sensors for capturing data associated with the user 102 and the object 106 of an image. Examples of additional sensors include a motion sensor, a vibration sensor, and/or a camera information capturing sensor. The motion sensor identifies travelling information of the user 102 based on changes in a location of the camera enabled device 104 of the user 102, in one example embodiment. The vibration sensor may identify the user's physical activity, for example exercising, an outdoor activity such as bike riding, etc.

The camera information capturing sensor captures data that includes a model of the camera 202, camera settings and preferences, a light level, a usage of flash, and a camera type (e.g., a camera mounted on a helmet or a vehicle, a fixed security camera, a smartphone, a digital single lens reflex camera, wearable Google® glasses, a hidden camera, etc). Data obtained from the additional sensors may also be a part of current contextual information.

Figure 3:
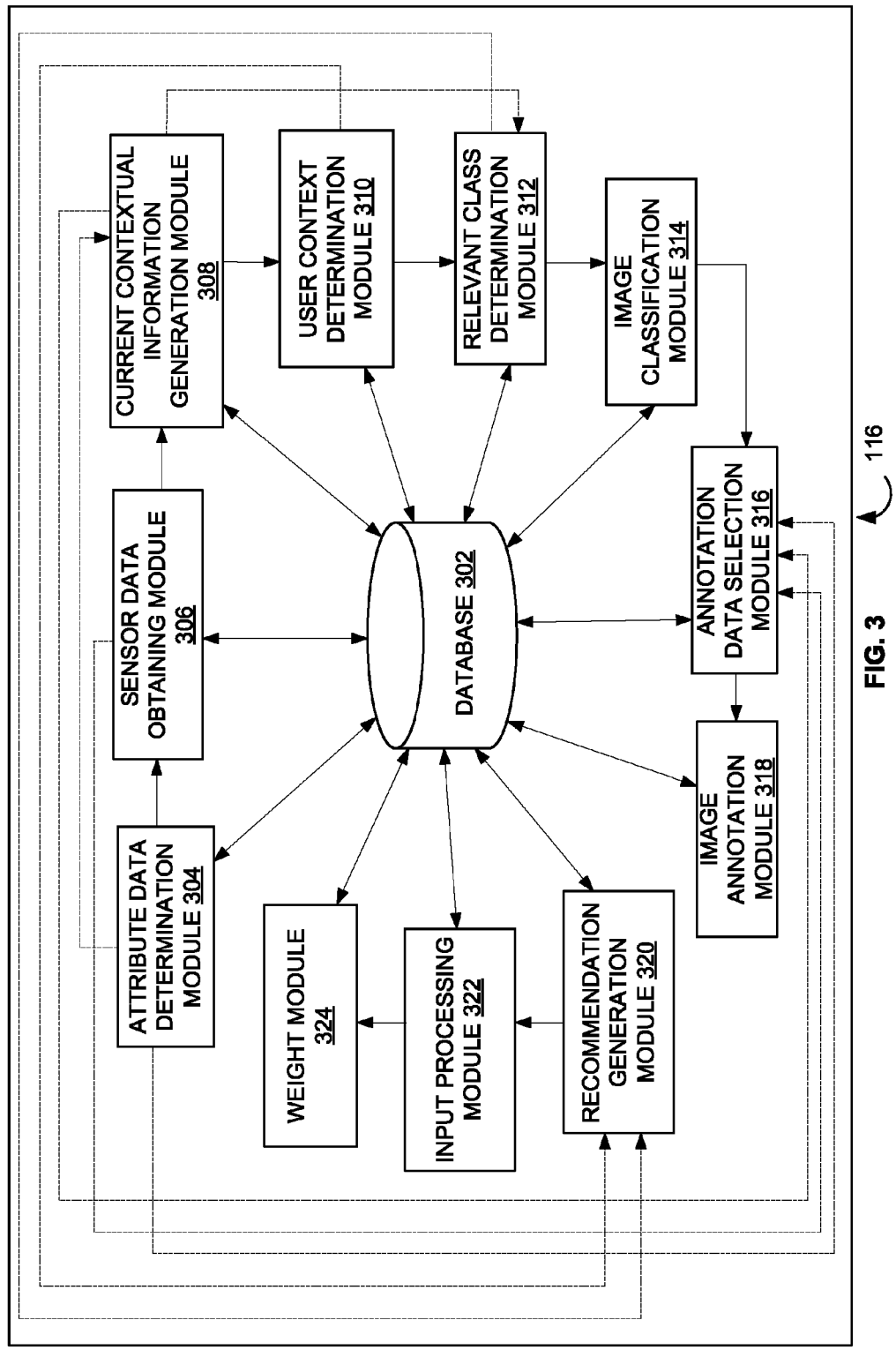
FIG. 3 is a system diagram of the image annotation and classification tool of the camera enabled device of FIG. 1 according to an embodiment herein.

FIG. 3, with reference to FIGS. 1 through 2, illustrates the image annotation and classification tool 116 of the camera enabled device 104 of FIG. 1 according to an embodiment herein. The camera enabled device 104 includes a processor (e.g., the processor 1210 of FIG. 12) and a memory unit (e.g., a memory 1202 of FIG. 12) that stores a set of modules associated with the image annotation and classification tool 116 and a database 302. The processor executes the set of modules include an attribute data determination module 304, a sensor data obtaining module 306, a current contextual information generation module 308, a user context determination module 310, a relevant class determination module 312, an image classification module 314, an annotation data selection module 316, an image annotation module 318, a recommendation generation module 320, an input processing module 322, and a weight module 324. The database 302 stores user pattern data that includes predefined user contexts.

The attribute data determination module 304 determines an attribute data associated with an object captured in an image based on features of the object. The sensor data obtaining module 306 obtains sensor data from the sensors 110 that are associated with a location of an object captured in an image based on the attribute data, in one embodiment. For example, the user 102 captures an image of an object (i.e., a painting) at a XYZ museum in Washington. Sensor data from the sensors 110 that are associated with the location (e.g., Washington or USA) of the object may include information on the painting from a public data such as electronic messages (e.g., Tweet™ messages), blogs or web, people at the XYZ museum from a social medium, and/or weather information of the location, Washington.

Based on an attribute data (i.e., an artistic work) determined using the attribute data determination module 304, the sensor data obtaining module 306 obtains sensor data include information on the painting from a public data such as Tweet™ messages, blogs or web at the location of the object, and/or people at the XYZ museum from a social medium, but not weather information.

The current contextual information generation module 308 generates a context vector (e.g., using the processor 1210 of FIG. 12) that includes current contextual information associated with the object 106. For example, Context vector=[Location data, Attribute data, Sensor data, and/or User's recent activity]. In one embodiment, the context vector is a row of sensor data at a point in time. The context vector may be represented as below:

$X(t)=[a, b, c, d]$, where x(t) is a context vector at time t, and a, b, c, and d are measurements from sensors 110.

Also, the context vector may be scaled with weights that may be represented as: $w=[w1, w2, w3, w4]$.

In one embodiment, scaling of the context vector may be represented as: $w1*a+w2*b+w3*c+w4*d$. Alternatively, scaling of the context vector may be represented as $wT*x(t)$, where wT is a transform of w (i.e., converting a row vector of weights to a column vector of weights). With a time series of sensor data from various locations associated with objects that are captured in images at various time (e.g., t1, t2, and t3), a matrix (S) may be generated and represented as:

S=[a1, b1, c1, d1
a2, b2, c2, d2
a3, b3, c3, d3]

With the context vector and/or the matrix, a user context associated with capturing an image is determined. The user context determination module 310 determines a recommended user context from predefined user contexts based on a comparison of current contextual information of an image of an object being captured with location data, attribute data, and sensor data of images associated with each of the predefined user contexts. A weight may be assigned for each predefined user contexts based on the comparison to obtain a list of prioritized predefined user contexts that may potentially be relevant to the current context of capturing the image. The user context determination module 310 further determines and recommends a highest priority user context (e.g., a context having a more weight) from the list of prioritized predefined user contexts as a recommended user context for the image. In another embodiment, the user context determination module 310 determines a match (e.g., a closest Euclidian distance) between the context vector of the object 106 and the context vectors from the user pattern data, and determines a context of the user 102 based on the match. In one embodiment, when there is no match found, the image annotation and classification tool 116 generates a message that prompts the user 102 to input a context and/or a classification associated with the image. In one embodiment, a weight vector that corresponds to the context vector of the object 106 is applied before performing a Euclidian distance calculation.

The relevant class determination module 312 determines a recommended class of the image of the object 106 based on the current contextual information and/or the recommended user context that is determined using the user context determination module 310. The image classification module 314 classifies the image of the object 106 into the recommended class that is determined using the relevant class determination module 312.

The annotation data selection module 316 selects annotation data from the current contextual information associated with the object 106 of the image based on the recommended class or the recommended user context. The image annotation module 318 annotates the image of the object 106 with the annotation data. The recommendation generation module 320 generates a recommendation that includes the recommended user context and/or the recommended class. When the recommendation that includes the recommended user context and/or the recommended class is incorrect, the user 102 inputs a user suggested context and a user suggested class. The input processing module 322 processes the user suggested context and the user suggested class, and stores in the database 302. In one embodiment, when the prioritized predefined user contexts does not include the user suggested context and the user suggested class, the prioritized predefined user contexts is updated to include the user suggested context and the user suggested class. A location data, an attribute data, and the sensor data for the user suggested context and the user suggested class may be obtained from corresponding location data, attribute data, and sensor data of the image of the object 106 being captured.

The weight module 324 modifies a weight associated with current contextual information of the image of the object 106 such that the user suggested context and/or the user suggested class is prioritized over the recommended user context and the recommended class of the list of prioritized predefined user contexts. For a subsequent image captured at a subsequent time, the user context determination module determines a revised recommended user context and/or a revised recommended class based on a modified weight.

In one embodiment, determining a recommended user context in capturing the image of the object 106, determining a recommended class of the image, and generating a recommendation including annotation data for annotating the image is performed at the annotation data server 112 using the image annotation and classification tool 116 as described below.

Figure 4:
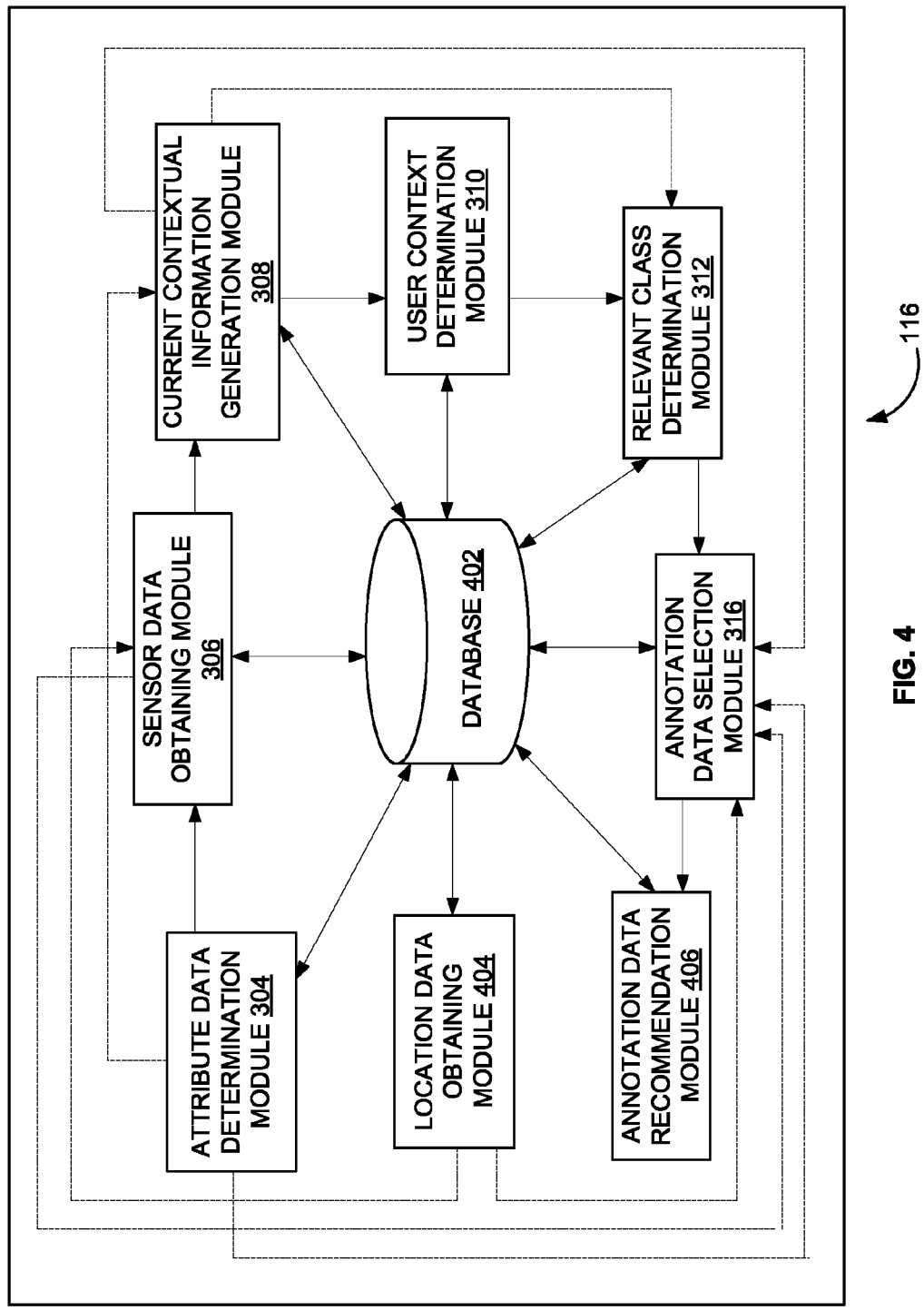
FIG. 4 is a system diagram of the image annotation and classification tool of the annotation data server of FIG. 1 according to an embodiment herein.

FIG. 4, with reference to FIGS. 1 through 3, illustrates the image annotation and classification tool 116 of the annotation data server 112 of FIG. 1 according to an embodiment herein. The annotation data server 112 includes a processor (e.g., a processor 1210 of FIG. 12) and a memory unit (e.g., a memory 1202 of FIG. 12) that stores a set of modules associated with the image annotation and classification tool 116 and a database 402. The processor executes the set of modules include a location data obtaining module 404, the attribute data determination module 304, the sensor data obtaining module 306, the current contextual information generation module 308, the user context determination module 310, the relevant class determination module 312, the annotation data selection module 316, and an annotation data recommendation module 406. The database 402 stores user pattern data that includes prior contextual information associated with various images captured by the user 102 in the past. The location data obtaining module 404 obtains a location data of the object 106 that is determined using the location data determining unit 114 of the camera enabled device 104 through the network 108 of FIG. 1.

With reference to FIGS. 1 through 3, as described above the attribute data determination module 304 determines an attribute data associated with the object 106, and a sensor data obtaining module 306 obtains sensor data from the sensors 110 that are associated with the location of the object. The current contextual information generation module 308 generates a context vector that includes current contextual information associated with the object 106 captured in the image. The user context determination module 310 determines a recommended user context. The relevant class determination module 312 determines a recommended class of the image of the object 106 based on the current contextual information and/or the recommended user context. The annotation data selection module 316 selects annotation data from the current contextual information associated with the object 106 based on the recommended user context or the recommended class.

The annotation data recommendation module 406 generates a recommendation that includes annotation data that is selected using the annotation data selection module 316. The recommendation that includes the annotation data may be communicated to the camera enabled device 104 for annotating the image. In one embodiment, annotation of the image is performed at the annotation data server 112, and an annotated image is communicated to the camera enabled device 104. It should be apparent to one of ordinary skill in the art that the image annotation and classification tool 116 of the annotation data server 112 stores and executes additional modules (e.g., the recommendation generation module 320, the input processing module 322, and the weight module 324) described above. In one embodiment, the modules of FIG. 3 and FIG. 4 are implemented as (i) a logically self-contained part of a software program that when executed by the processor performs one or more functions as described above, and/or (ii) a self-contained hardware component.

FIG. 5, with reference to FIGS. 1 through 4, is a table view illustrating predefined user contexts 502 that includes classes (not shown in FIG. 5), one or more images 504 associated with each context, and prior contextual information 506 associated with each image stored in the database 302 or 402 according to an embodiment herein. In one embodiment, the images 504 were captured by the user 102 at some point in the past. The prior contextual information 506 of each of the images 504 includes, but is not limited to, a class, a location data, an attribute data, a user context, and/or a context vector associated with each image 504.

For example, prior contextual information associated with an image 'photo of sky' captured by the user 102 in the past includes, a predefined user context 'weather', a class 'Forecasts', a location data, an attribute data 'sky', user context 'weather information', and a context vector may include: Context vector=(60°, 37.0000° N, 120.0000° W, Jan. 1, 2014, 10 PM, Sky, Weather information).

Similarly, the images 504 of each of the predefined user contexts 502 include corresponding prior contextual information stored in the database 302 or 402. For instance, prior contextual information associated with an image 'Photo of a person 'John'' captured by the user 102 in the past includes, a predefined user context 'social', a class 'Friends', a location data, an attribute data 'person', user context 'Sharing photos', and a context vector may include: Context vector=(2 meters, 20°, 40.6700° N, 73.9400° W, Jan. 10, 2014, 8 PM, person, application, social, John, buddy).

Another example of prior contextual information associated with an image 'Photo of an airplane in the sky' captured by the user 102 in the past includes, a predefined user context 'travel', a class 'Travel information', a location data, an attribute data 'Sky and Airplane', a user context 'flight information', and a context vector may include: (60°, 37.0000° N, 120.0000° W, Jan. 1, 2014, 11 PM, sky, airplane, flight information.

FIG. 6, with reference to FIGS. 1 through 5, is a table view illustrating classification of an image 602 captured by two different users 102, 604 into two different classes 606 based on contexts 608 of the users according to an embodiment herein. For example, the user 102 and a user 604 capture an image 602 of Sky. The image annotation and classification tool 116 obtains a location data of an object (i.e., Sky).

The attribute data determining module 304 determines an attribute data associated with an object of the image 602 as 'Sky'. The sensor data obtaining module 306 obtains sensor data from an environmental sensor (e.g., weather information, humidity information, and temperature information) and public information (e.g., information on galaxy from blogs at the object location, and information on rainbow) available at the object location. The image annotation and classification tool 116 generates a context vector for the image 602 captured by the user 102 with current contextual information 610. Context vector=(Camera facing upward, 60°, 62.2270° N, 105.3809° W, Jan. 2, 2014, 6 AM, Sky, weather information, humidity information, temperature information, information on galaxy from blogs at the object location, information on rainbow).

The user context determination module 310 compares the context vector associated with the image 602 captured by the user 102 with context vectors associated with the images 504 of the predefined user contexts 502. The user context determination module 310 determines a list of prioritized predefined user contexts based on a comparison between the context vector associated with the image 602 and the context vectors associated with the images 504.

For example, a list of prioritized predefined user context includes a first priority context as 'weather', a second priority context as 'flight information', and a third priority context as 'social'. Accordingly, a first highest weight is assigned to the context 'weather', a second highest weight to the context 'flight information', and a third highest weight to the context 'social'. The recommendation generation module 320 generates a recommendation that includes a user recommended context (e.g., weather) and/or a user recommended class (e.g., forecasts). In one embodiment, the user 102 indicates the recommendation is correct. In another embodiment, the user 102 inputs a user suggested context (e.g., social) and/or a user suggested class (e.g., post image) when the recommendation is incorrect. The input processing module 322 processes the user suggested context and the user suggested class, and includes it to the predefined user contexts 502. The weight module 324 modifies a weight associated with the location data, the attribute data, and the sensor data associated with the image 602 such that the user suggested context and the user suggested class is prioritized over the recommended user context and the recommended class. For a subsequent image captured at a subsequent time, the user context determination module 310 determines a revised recommended user context and a revised recommended class based on a modified weight.

The context of the user 102 in capturing the image 602 is same as the context of the user 102 in capturing the image 'Photo of sky', in one embodiment. In another embodiment, the context (e.g., humidity information) of the user 102 in capturing the image 602 may be related with the context (e.g., weather information) of the user 102 in capturing the image 'Photo of sky'.

Based on the context (e.g., 'weather information'), the relevant class determination module 312 determines a class of the image 602 to cluster the image 602 with the class. In one embodiment, a class of the image 602 is related to or is the same as a class (e.g., Forecasts) of an image (e.g., Photo of sky) from the database 302 or 402 that includes a context vector which matches the context vector of the image 602. The image 602 may be automatically clustered with the class 'forecasts'. Based on the class 'Forecats' of the image 602 or the context 'weather information', the annotation data selection module 316 selects annotation data from the location data, the attribute data, and/or the sensor data (i.e., the weather and/or humidity information) to annotate the image 602.

However, annotations and a class of the image 602 captured by the user 604 are different from annotations and a class of the image 602 captured by the user 102, since a context of the user 102 and 604 in capturing the image 602 differs. For instance, the database 302 stores (a) an image 'Photo of sky' captured by the user 604 in the past, (b) a corresponding class (e.g., nature) of the image, and (c) corresponding prior contextual information that includes a user context 'Galaxy information'. When the user 604 captures the image 602, the user context determination module 310 determines a current context of the user 604 as 'Galaxy information' by determining a match between a current context vector and a context vector associated with the image 'Photo of sky'.

The relevant class determination module 312 determines a class (e.g., 'nature') of the image 602 may be similar as a class of the image 'Photo of sky' based on the user context. Based on the class 'nature' of the image 602 or the context 'galaxy information', the annotation data selection module 316 selects annotation data from a location data, an attribute data, and/or the sensor data (i.e., information on galaxy from blogs at the object location, and/or information on rainbow) to annotate the image 602. Thus, the image 602 captured by users 102 and 604 is classified into a class 'forecasts' and a 'nature' respectively. Similarly, the annotation data of the image 602 captured by the users 102 and 604 also differs. In one embodiment, the same sensor data may have different meanings depending upon contexts of users.

FIG. 7, with reference to FIGS. 1 through 6, is a table view illustrating personalized annotations 702 of an image 704 captured by two different users 102, 708 having a similar context 706 according to an embodiment herein. For example, the user 102 and a user 708 capture an image 704 of a person 'John'. With current contextual information 710, the image annotation and classification tool 116 generates a context vector for the image 704 captured by the user 102 may include: Context vector=(4 meters, camera facing upward, 37.3700° N, 122.0400° W, Feb. 1, 2014, person, John). The current contextual information 710 includes data from a social sensor of the sensors 110 that includes data for recognizing the person in the captured image 704.

The user context determination module 310 compares the context vector associated with the image 704 captured by the user 102 with context vectors associated with the images 504 of the predefined user contexts 502. For example, a closest match found by the user context determination module 310 for the context vector of the image 704 is a context vector associated with an image 'Photo of a person John' of FIG. 5. The context vector of the image 'Photo of a person John' also includes a connectivity of the user 102 with the person 'John'. A context (e.g., social) of the user 102 is determined based on the match.

The annotation data selection module 316 selects annotation data from at least one of the location data, the attribute data, and the sensor data associated with the image 704, and/or the prior contextual information that includes the connectivity (e.g., friend) of the user 102 with the person 'John'. The image annotation module 318 annotates the image 704 with the annotation data (e.g., John, my friend).

However, annotations of the image 704 captured by the user 708 are different from annotations of the image 704 captured by the user 102, even though a context of the user 102 and 708 in capturing the image 704 is the same. This is because prior contextual information including a connectivity of the person 'John' with the user 102 is different from the user 708. In one embodiment, connectivity data is provided by the user 102 or 708. In another embodiment, connectivity data is automatically obtained from a social sensor of the sensor 110.

FIG. 8, with respect to FIGS. 1 through 7, is a table view illustrating a context 802 of the user 102 determined based on location data 804 of an object captured in an image and a set of rules stored in the database 302 or 402 according to an embodiment herein. The set of rules include rule results, contexts (i.e., the one or more recommended user contexts), and/or classifications i.e., (the one or more recommended user classes) for location data, attribute data, and/or sensor data associated with various objects being captured. In one embodiment, the set of rules are defined by the user 102, a manufacturer of the camera enabled device 104, or an administrator of the annotation data server 112. For example, the set of rules include a rule result 'object may be a menu card' and a context 'food or diet' for a location data that includes an object location which is a restaurant, a camera position that is facing down, and a range which is close.

When the user 102 captures an image of an object at a restaurant at a close range using the camera enable device 104 which is facing down, the image annotation and classification tool obtains a rule result 806 'object may be a menu card' and a context 802 'food or diet' from the set of rules. In one embodiment, the set of rules are specific to the user 102. Based on the context 802, the image of the object is classified using the image annotation and classification tool 116.

The set of rules may also include rule results and context for the attribute data of various objects. For example, the set of rules include a rule result 'object may be feet of a person' and context 'walking statistics or shopping' for an attribute data that indicates a type of an object that is captured in an image of a person and when the camera enabled device 104 is facing down.

Similarly, when the user 102 captures an image of an object 106 at his/her office at a close range using the camera enabled device 104 which is in a horizontal position, the image annotation and classification tool 116 obtains a rule result 806 'object may be a person' and a context 802 'business or social' from the set of rules. The time at which the image of the object is captured is given as a working time (e.g., 9 AM to 5 PM), and then the context 802 may be business. A time at which the image of the object is captured is given as a leisure time (e.g., 7 PM to 10 PM), and then a context 802 may be social.

Also, based on the usage of a camera (e.g., a front camera) to capture an image of an object, the image annotation and classification tool 116 determines a rule result 806 'object may be a self picture' from the set of rules. Likewise, based on the location data 804 of the table view of FIG. 8, a context 802 and a rule result 806 associated with each image are obtained from the set of rules, and images are classified based on the context 802.

FIG. 9, with reference to FIGS. 1 through 8, is a table view illustrating rules 902 for sharing images 904 according to an embodiment herein. The image annotation and classification tool 116 determines image information and obtains a corresponding rule for sharing the image from set of rules stored in the database 302 or 402. Examples of image information include an object captured in an image, a location of an object, a relation of an image with any events, and an image is tilted up or tilted down. In one embodiment, the image information is obtained based on a location data, an attribute data, and/or sensor data associated with an object.

For example, the user 102 captures an image of a person who is a friend of the user 102 as indicated and defined by a social medium application (e.g., Facebook®, LinkedIn®, etc.). Based on data from a social sensor, the image annotation and classification tool determines image information such as an identity (e.g., a name) and a connectivity of the person captured in the image with the user 102. Based on the image information, the image annotation and classification tool 116 obtains a rule 902 'share the image on the social medium' from set of rules. Similarly, based on image information associated with each image 904 of the table view of FIG. 9, a rule 902 is obtained for sharing each image. In one embodiment, over a period of time, the image annotation and classification tool 116 generates new rules or updates existing rules based on user suggested context and user suggested classes. For example, when the user 102 captures an image of a building at a location XYZ, the image annotation and classification tool 116 determines a recommended user context (e.g., favorite architecture) and a recommended class (e.g., construction) associated with the image based on the set of rules. When the recommended user context and/or the recommended class is incorrect, the user 102 may train the image annotation and classification tool 116 by inputting a user suggested context (e.g., My office) and a user suggested class (e.g., social). Based on the user suggested context and/or the user suggested class, a new rule may be generated or an existing rule may be updated for identifying a user context and a class of a similar image captured at a subsequent time.

In one embodiment, using the image annotation and classification tool 116, the user 102 may define set of rules for classifying images. The set of rules relate to user input and define classifications of images. For example, the user 102 has scheduled a trip to an amusement park, and defines a set of rules. An example of a set of rules that relate to user input include 'when a user presses a number '1' using a keypad or a virtual keypad of the camera enabled device 104 after capturing an image, classify the image into a class 'Water rides''. Another example of set of rules include when a user presses a number '2' using a keypad or a virtual keypad of the camera enabled device 104', classify the image into a class 'resort'.

When the user 102 visits an amusement park and captures an image, and presses the number '1', the image is automatically classified into the class 'Water rides'. Similarly, when the user 102 captures another image, and presses the number '2', the image is automatically classified into the class 'resort'. In one embodiment, after capturing an image, classes and corresponding numbers that are pre-defined are displayed to the user 102. The user 102 may input a number for classifying the image. Also, for a captured image, at least one of a location data, an attribute data, a sensor data, and a user context are determined using the image annotation and classification tool 116 and annotations are generated.

Images that are classified using a set of rules and its corresponding classes and contextual information are stored in the database 302 or 402 as user pattern data. The user 102 does not need to classify a similar image manually in the future. The image annotation and classification tool 116 determines a context based on current contextual information and the user pattern data, classifies and annotates the image automatically based on the context.

Figure 10:
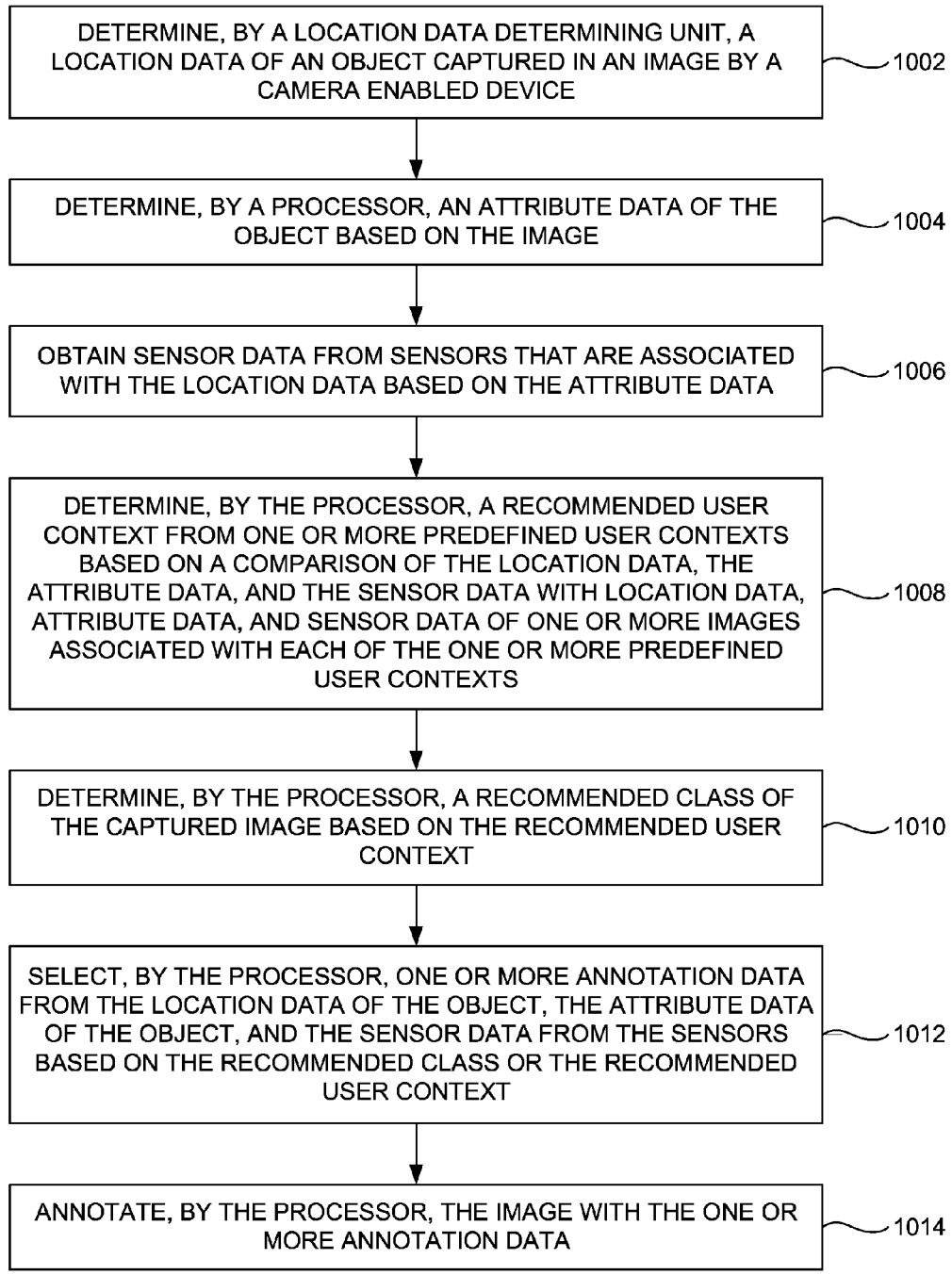
FIG. 10 is a flow diagram illustrating a method for annotating and classifying an image based on a user context according to an embodiment herein.

FIG. 10, with reference to FIGS. 1 through 9, is a flow diagram illustrating a method for annotating and classifying an image based on a user context according to an embodiment herein. In step 1002, a location data of an object that is captured in an image by a camera enabled device 104 is determined (e.g., by a location data determining unit 114 of FIG. 1). In step 1004, an attribute data of the object is determined (by the processor 1210 of FIG. 12) based on the image. In step 1006, sensor data from one or more sensors 110 that are associated with the location data is obtained (e.g., using the sensor data obtaining module 306 of FIG. 3) based on the attribute data. In step 1008, a recommended user context is determined (e.g., by the recommendation generation module 310 when executed by the processor 1210 of FIG. 12) from one or more predefined user contexts based on a comparison of the location data, the attribute data, and the sensor data with location data, attribute data, and sensor data of one or more images associated with each of the one or more predefined user contexts. In step 1010, a recommended class of the captured image is determined (e.g., by the processor 1210 of FIG. 12) based on the recommended user context. In step 1012, one or more annotation data is selected (e.g., by the annotation data selection module 316 of FIG. 3 when executed by the processor 1210 of FIG. 12) from the location data of the object, the attribute data of the object, and the sensor data from the sensors based on the recommended class or the recommended user context. In step 1014, the image is annotated (e.g., by the image annotation module 318 of FIG. 3 when executed by the processor 1210 of FIG. 12) with the one or more annotation data.

A list of prioritized predefined user contexts may be generated by the processor 1210 based on the comparison. The recommended user context is a highest priority user context from the list of prioritized predefined user contexts. A recommendation that includes at least one of the recommended user context and the recommended class may be generated (e.g., by the recommendation generation module 310 of FIG. 3 when executed by the processor 1210 of FIG. 12), and at least one of a user suggested context and a user suggested class is processed by the processor 1210.

Figure 12:
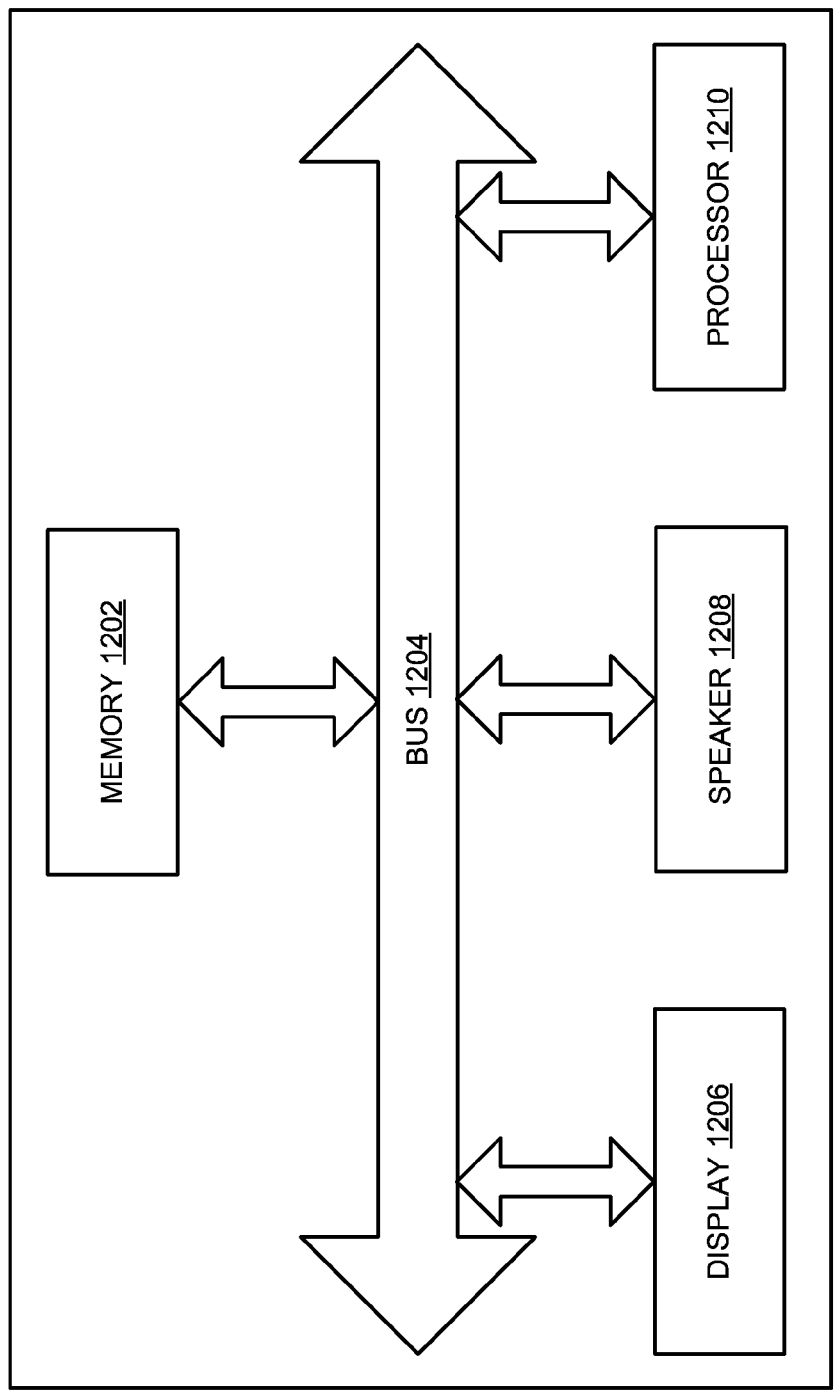
FIG. 12 illustrates system block diagram of the camera enabled device or the annotation data server of FIG. 1 according to an embodiment herein.

A weight associated with the location data, the attribute data, and the sensor data associated with the captured image may be modified (e.g., by the weight module 324 of FIG. 3) to obtain a modified weight based on which the user suggested context or the user suggested class is prioritized over the recommended user context or the recommended class, and a revised recommended user context or a revised recommended class is determined (e.g., by relevant class determination module 312 when executed by the processor 1210 of FIG. 12) for a subsequent image captured at a subsequent time based on the modified weight.

The recommended user context and the recommended class of the captured image are determined based on a set of rules that are stored in the database (the database 302 or the database 402). The location data of the object includes at least one of a distance of the object from the camera enabled device 104, a camera inclination angle associated with the camera enabled device 104, a latitude and longitude data of the object, and a timestamp of the image.

The sensors 110 that are associated with the location data may include an environmental sensor, an object sensor, and a social sensor. The sensor data obtained from the environmental sensor may include weather data, temperature data, pressure data, humidity data, wind data, precipitation data, and data from a chemical sensor, an allergen sensor, a noise sensor, and a light sensor.

The sensor data obtained from the object sensor includes the attribute data of the object in the image. The sensor data obtained from the social sensor may include private data to identify a person in the image, data associated with people at the location of the object, and data from a social medium. The sensor data may include reviews, articles, electronic (e.g. Tweet™) messages, information from the World Wide Web (or the Internet), and news from a location of the object.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. The embodiments herein can include hardware and software embodiments. The embodiments that comprise software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
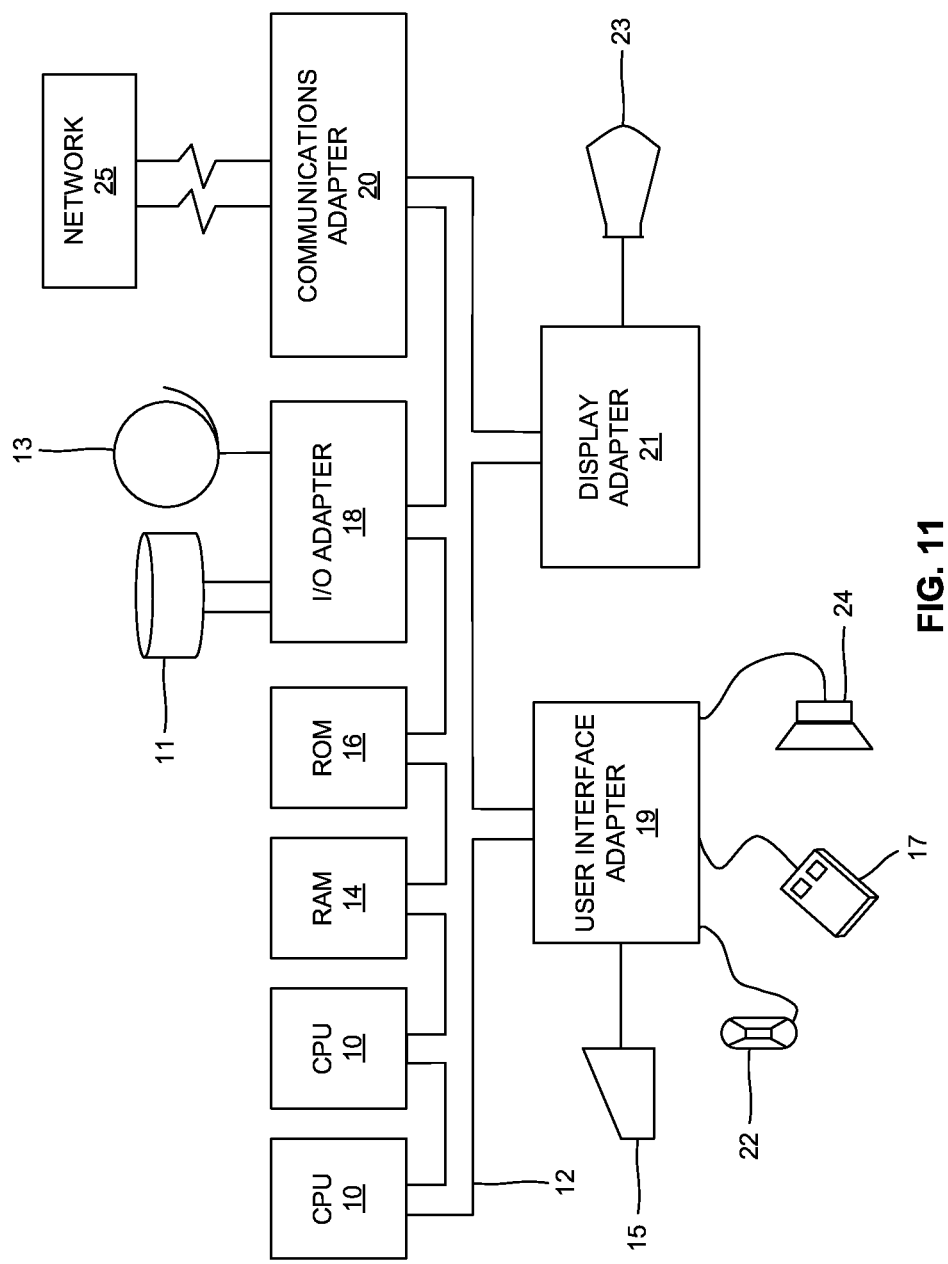
FIG. 11 illustrates a schematic diagram of a computer architecture used in accordance with the embodiments herein.

A representative hardware environment for practicing the embodiments herein is depicted in FIG. 11, with reference to FIGS. 1 through 10. FIG. 11 illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

FIG. 12, with reference to FIGS. 1 through 11, illustrates a system block diagram of the camera enabled device 104 or the annotation data server 112 of FIG. 1 having an a memory 1202 having a computer set of instructions, a bus 1204, a display 1206, a speaker 1208, and a processor 1210 capable of processing a set of instructions to perform any one or more of the methodologies herein, according to an embodiment herein. The processor 1210 may also enable digital content to be consumed in the form of video for output via one or more displays 1206 or audio for output via speaker and/or earphones 1208. The processor 1210 may also carry out the methods described herein and in accordance with the embodiments herein. Digital content may also be stored in the memory 1202 for future processing or consumption. The memory 1202 may also store program specific information and/or service information (PSI/SI), including information about digital content (e.g., the detected information bits) available in the future or stored from the past. A user of the camera enabled device 104 or the annotation data server 112 may view this stored information on display 1206 and select an item of for viewing, listening, or other uses via input, which may take the form of keypad, scroll, or other input device(s) or combinations thereof. When digital content is selected, the processor 1210 may pass information. The content and PSI/SI may be passed among functions within the camera enabled device 104 or the annotation data server 112 using bus 1204.

The image annotation and classification tool 116 determines a context and an intention of users (e.g., user 102) in capturing images, and so annotations of the images are specific to users. Sensor data are obtained from a location of an object 106 captured in an image (e.g., images 504, for example). Even when an image has multiple meanings and various possible annotations, a precise annotation is obtained for tagging the image based on a user context and intention. Over a period of time, the image annotation and classification tool 116 improves understanding of a user context and intention and annotations through a learning algorithm. The image annotation and classification tool 116 differentiates between a same user in different contexts with different purposes based on user pattern data. Also, since classification of images is performed based on a user context, the images are clustered into a relevant class and are easy to organize.

Using the image annotation and classification tool 116, the user 102 can easily provide an input (e.g., notes, annotations, editing annotations, and class information) related to an image. The embodiments explained above describe annotating and classifying an image using the image annotation and classification tool 116. However, a video also can be annotated with a location data, an attribute, and/or sensor data in addition with camera information. Annotation of video provides a timeline of annotated data that may be imported as notes into video editing software (e.g., Final Cut). Annotations may be added to a video at fixed intervals and/or adaptively based on change in a range or sensor data.

The image annotation and classification tool 116 learns to predict a context of capturing an image (e.g., a monument), and from within the context can predict a classification of the image based on a feedback from the user 102. When the image annotation and classification tool 116 suggests a context or a classification based on a vector of sensor data (e.g., contextual vector), the user 102 may correct the suggestion. A feedback loop of suggestions and corrections over time trains the image annotation and classification tool 116 in determining classifications of images.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A camera enabled device for classifying an image based on a user context, said camera enabled device comprising:
   a camera that captures an image of an object;
   a location data determining unit that determines a location data of said object captured in said image;
   a memory unit that stores a set of modules and a database; and
   a processor that executes said set of modules, wherein said set of modules comprises:
     an attribute data determination module that determines an attribute data of said object based on said image;
     a sensor data obtaining module that obtains sensor data from sensors that are associated with said location data based on said attribute data;
     a user context determination module that determines a recommended user context from a plurality of predefined user contexts based on a comparison of said location data, said attribute data, and said sensor data with location data, attribute data, and sensor data of a plurality of images associated with each of said plurality of predefined user contexts;
     a relevant class determination module that determines a recommended class of said image based on said recommended user context; and
     an image classification module that classifies said image based on said recommended class.

2. The camera enabled device of claim 1, wherein said set of modules comprise:
   an annotation data selection module that selects a plurality of annotation data from at least one of said location data, said attribute data, and said sensor data based on said recommended class or said recommended user context; and
   an image annotation module that annotates said image with said annotation data.

3. The camera enabled device of claim 1, wherein said user context determination module generates a list of prioritized predefined user contexts based on said comparison, wherein said recommended user context is a highest priority user context from said list of prioritized predefined user contexts.

4. The camera enabled device of claim 1, wherein said set of modules comprise:
   a recommendation generation module that generates a recommendation comprising at least one of said recommended user context and said recommended class; and
   an input processing module that processes at least one of a user suggested context and a user suggested class.

5. The camera enabled device of claim 4, wherein said set of modules comprise a weight module that modifies a weight associated with at least one of said location data of said object, said attribute data of said object, and said sensor data from said sensors associated with said image to obtain a modified weight based on which said user suggested context and said user suggested class are prioritized over said recommended user context and said recommended class, wherein said user context determination module determines a revised recommended user context and a revised recommended class for a subsequent image captured at a subsequent time based on said modified weight.

6. The camera enabled device of claim 1, wherein said recommended user context and said recommended class of said image are determined based on a set of rules that are stored in said database.

7. The camera enabled device of claim 1, wherein said location data determining unit comprises:
- a range finder that records a distance of said object from said camera enabled device;
- a tilt-roll-pitch sensor that calculates a camera inclination angle of said camera enabled device;
- a global positioning system that determines a location of said object; and
- a compass that calculates a latitude and longitude data of said object.

* * * * *